United States Patent [19]

Rutke

[11] Patent Number: 5,139,123
[45] Date of Patent: Aug. 18, 1992

[54] OUTER CAGE FOR ONE-WAY SPRAG CLUTCH

[75] Inventor: Russell J. Rutke, Palos Heights, Ill.

[73] Assignee: Borg-Warner Automotive Transmission & Engine Components Corporation, Sterling Heights, Mich.

[21] Appl. No.: 684,627

[22] Filed: Apr. 11, 1991

[51] Int. Cl.⁵ .............................................. F16D 41/07
[52] U.S. Cl. .................... 192/45.1; 192/41 A; 192/113 B
[58] Field of Search ................. 192/45.1, 41 A, 113 B

[56] References Cited

U.S. PATENT DOCUMENTS

| | | | |
|---|---|---|---|
| 2,683,509 | 7/1954 | Jandasek | 192/45.1 |
| 3,175,661 | 3/1965 | Maurer et al. | 192/113.13 X |
| 4,635,770 | 1/1987 | Shoji et al. | 192/45.1 X |
| 4,792,028 | 12/1988 | Nishimura et al. | 192/41 A |
| 4,875,564 | 10/1989 | Leitz et al. | 192/45.1 |
| 4,979,600 | 12/1990 | Zanoni | 192/45.1 X |
| 5,016,741 | 5/1991 | Leitz | 192/45.1 |

Primary Examiner—Rodney H. Bonck
Attorney, Agent, or Firm—Emch, Schaffer, Schaub; Greg Dziegielewski

[57] ABSTRACT

A one-way sprag clutch assembly for use in an automatic transmission or similar application including an inner race (42), an outer race (44) having a pair of annular grooves (63, 68) cut in the interior surface (45) thereof, and a clutch assembly (41) having an inner cage member (46), an outer cage member (53) and an intermediate energizing spring (49), the cage members and spring having generally aligned openings (47, 51, 55) for receiving a plurality of sprags (48) therein. A side wall (56) is integrally formed with and perpendicular to the outer annular cage member (53) to create, with an end cap (64) on the opposite end of the assembly, lubrication escape barriers for lubricant in the assembly. The side wall (56) further includes either an integrally formed annular protrusion or a plurality of radially extending axial positioning protrusions (62) received in one of the annular grooves (63) to cooperate with a snap ring (67) received in the other grooves (68) to retain the clutch assembly (41) from axial movement with respect to the races (42, 44). Drag lands (58) are integrally formed on a plurality of spaced crossbars (57) in the cage member and extend radially outwardly from the crossbars (57) to terminate in arcuate surfaces (61) engaging the interior surface (45) of the outer race (44) to provide for inertial resistance for the clutch assembly (41) relative to the races (42, 44).

9 Claims, 2 Drawing Sheets

OUTER CAGE FOR ONE-WAY SPRAG CLUTCH

TECHNICAL FIELD

The invention disclosed herein relates to a one-way sprag clutch wherein the configuration of the outer cage for the clutch is redesigned to provide the functions of a drag clip, a snap ring and a lubrication escape trap, thus eliminating separate members that previously provided these features.

BACKGROUND

A conventional one-way sprag clutch typically contains an inner cage member and a concentric outer cage member with an energizing spring therebetween for proper sprag/wedging element control on the inner and outer surfaces of an outer race and an inner race, respectively; drag clips secured to the outer cage member to reduce the relative motion inertia effects of the one-way clutch with respect to the outer race, yet allowing minimal indexing relative to the outer race; and end caps at the ends of the clutch to provide proper spacing alignment of the inner and outer races relative to each other and serve as lubrication escape traps to restrict the outflow of lubricant which enters the sprag clutch at the center of the sprag element.

A conventional one-way sprag clutch also typically requires external means for axial positioning of the clutch so that the sprags are in a stable position for engagement. Additionally, a conventional sprag clutch includes a centrally positioned energizing spring between the inner and outer cage members which cooperates with a plurality of sprag members to urge the sprags to their engaged positions. Both the inner cage member, outer cage member and energizing spring contain a plurality of generally radially aligned openings for the reception of the sprags into the clutch assembly. The usual external positioning means utilized for sprag clutches can be one or more snap rings which are received in annular grooves formed in the inner surface of the outer race closely adjacent the inner and outer ends of the outer cage member. The present invention eliminates a number of separate members in the clutch assembly by providing an improved outer cage member for the sprag clutch.

DISCLOSURE OF THE INVENTION

This invention relates to an improved one-way sprag clutch for an automatic transmission or similar application wherein a consolidated outer cage member has the combined functions of providing drag means for the cage member, providing proper spacing alignment of the inner and outer races of the clutch, axially positioning the clutch assembly between the races and acting as a lubrication escape trap for lubricant which is present within the sprag clutch. Thus, the outer cage member incorporates an integral flange or side wall at one end thereof acting as a lubrication barrier for the clutch, radial protrusions on the end wall of the outer cage member to axially position the clutch within the races, and circumferentially spaced lateral protrusions on the outer cage member which act as drag means for the clutch.

BEST MODE OF CARRYING OUT THE INVENTION

Figure 1:
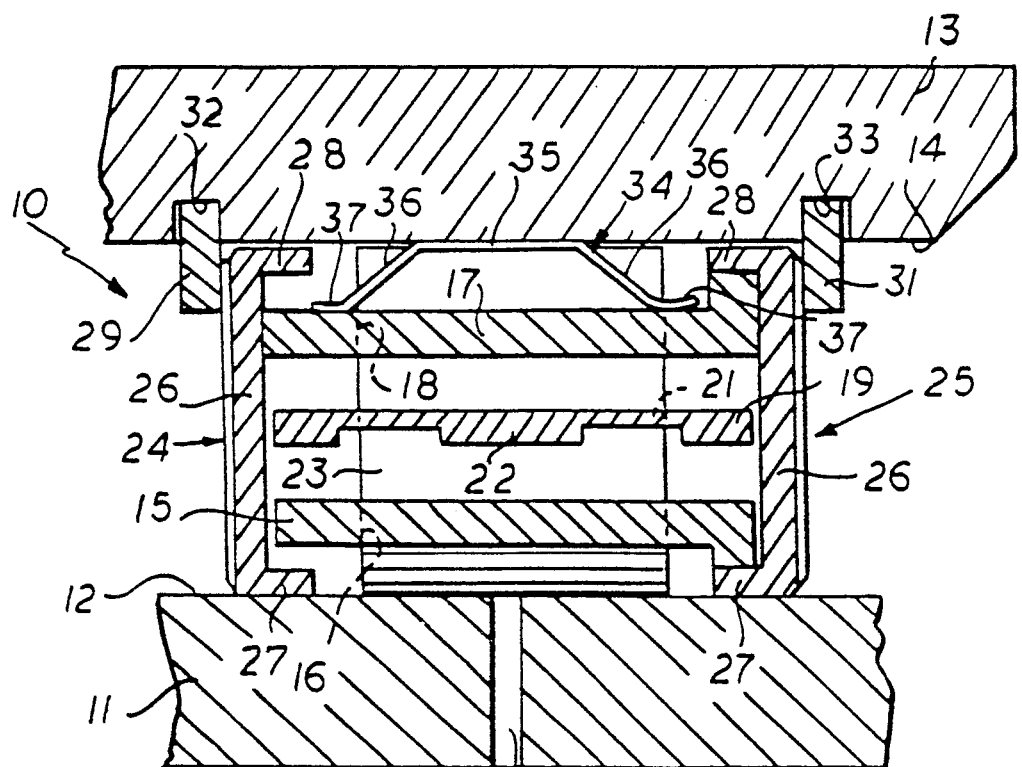
FIG. 1 is a cross sectional view through a typical one-way sprag clutch showing the various elements therein.

Referring more particularly to the disclosure in the drawings wherein is shown an illustrative embodiment of the present invention, FIG. 1 discloses a prior conventional one-way sprag clutch construction, wherein a one-way clutch assembly 10 is positioned between an exterior surface 12 of an inner race 11 and an interior surface 14 of a concentric outer race 13. The assembly consists of an annular inner cage member 15 adjacent the inner race containing a plurality of openings 16, an annular outer cage member 17 adjacent the outer race containing a plurality of openings 18, a generally annular energizing spring 19 having a series of circumferentially spaced openings 21, each opening containing a central flexible tab 22 extending thereinto, and a plurality of sprags 23 which are received within the generally radially aligned openings 16, 18 and 21 to engage the surfaces 12, 14 of the inner and outer races in wedging engagement. Each sprag has a generally hourglass shape with the energizing spring tab 22 adapted to engage an indentation of the hourglass shape to urge the sprag into wedging engagement with the races.

Located at opposite ends of the clutch assembly 10 are a pair of end caps or bearings 24 and 25, each cap consisting of an annular wall 26 terminating in inner and outer annular flanges 27 and 28 which fit around and encompass the edges of the inner and outer cage members. Also, the flanges are closely adjacent the interior surface 14 of the outer race 13 and the exterior surface 12 of the inner race 11 to provide proper spacing alignment of the inner and outer races. To retain the clutch assembly axially within the races, one or two snap rings 29 and 31 are located in annular grooves 32 and 33 formed in the interior surface 14 of the outer race 13 closely adjacent the end caps 24, 25. Also, a plurality of generally U-shaped drag clips 34 are positioned within the clutch assembly between adjacent sprags and circumferentially equally spaced around the cage; each drag clip including a generally flat base 35 contacting the race surface 14 and a pair of diverging fingers 36 extending from the base to terminate in curved ends 37 engaging the outer surface of the outer cage member 17. A lubricant entry hole 38 formed in the inner race allows lubricant to enter the clutch assembly 10, and the end caps 24 and 25 act as lubrication escape traps to restrict the outflow of lubricant in an axial direction between the races.

Figure 2:
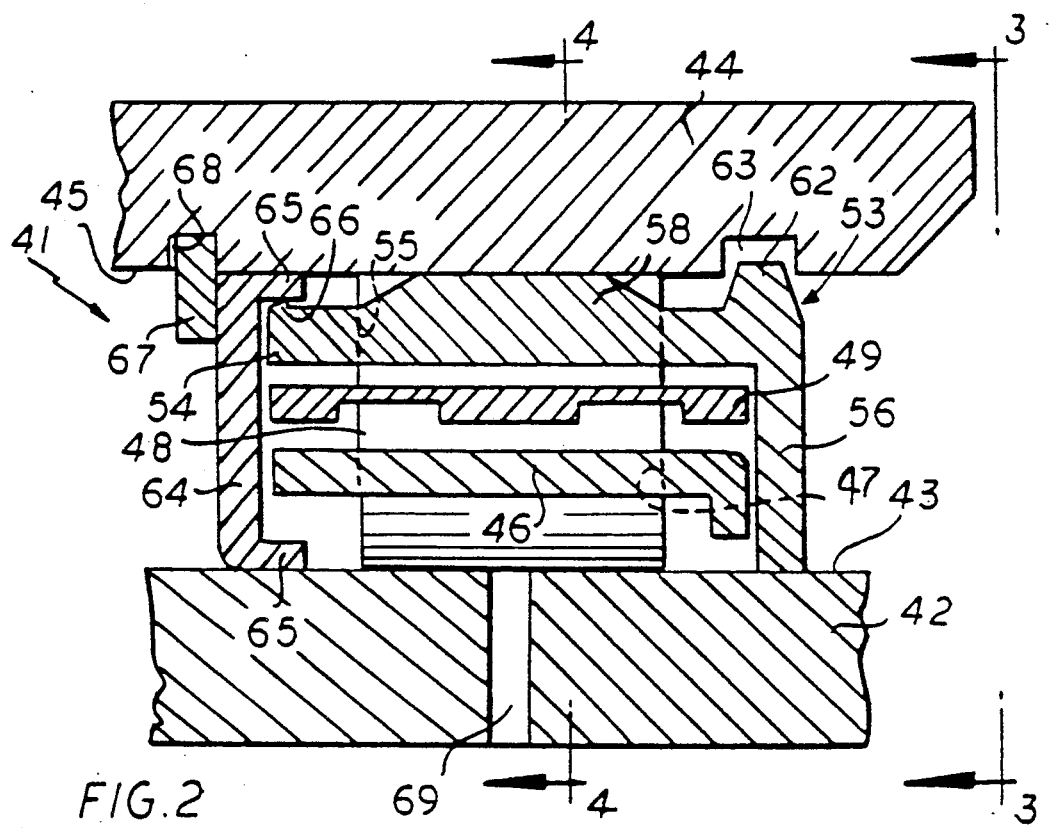
FIG. 2 is a cross sectional view similar to FIG. 1 of a one-way sprag clutch as modified according to the invention.
Figure 3:
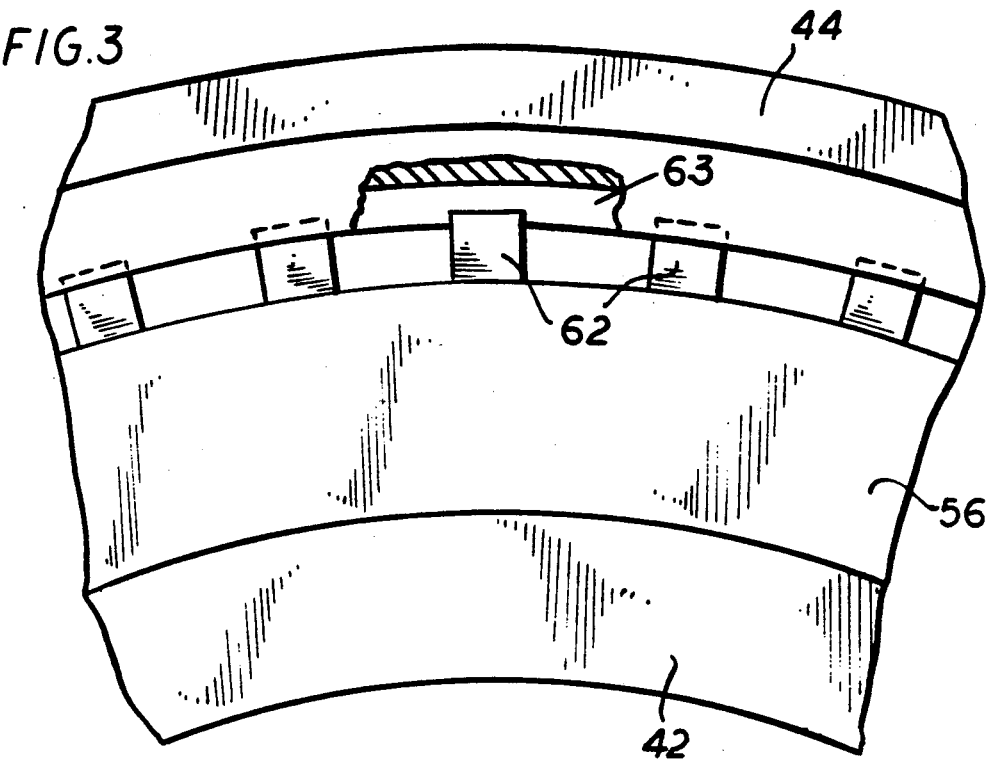
FIG. 3 is an end elevational view, partially in cross section, taken on line 3—3 of FIG. 2.
Figure 4:
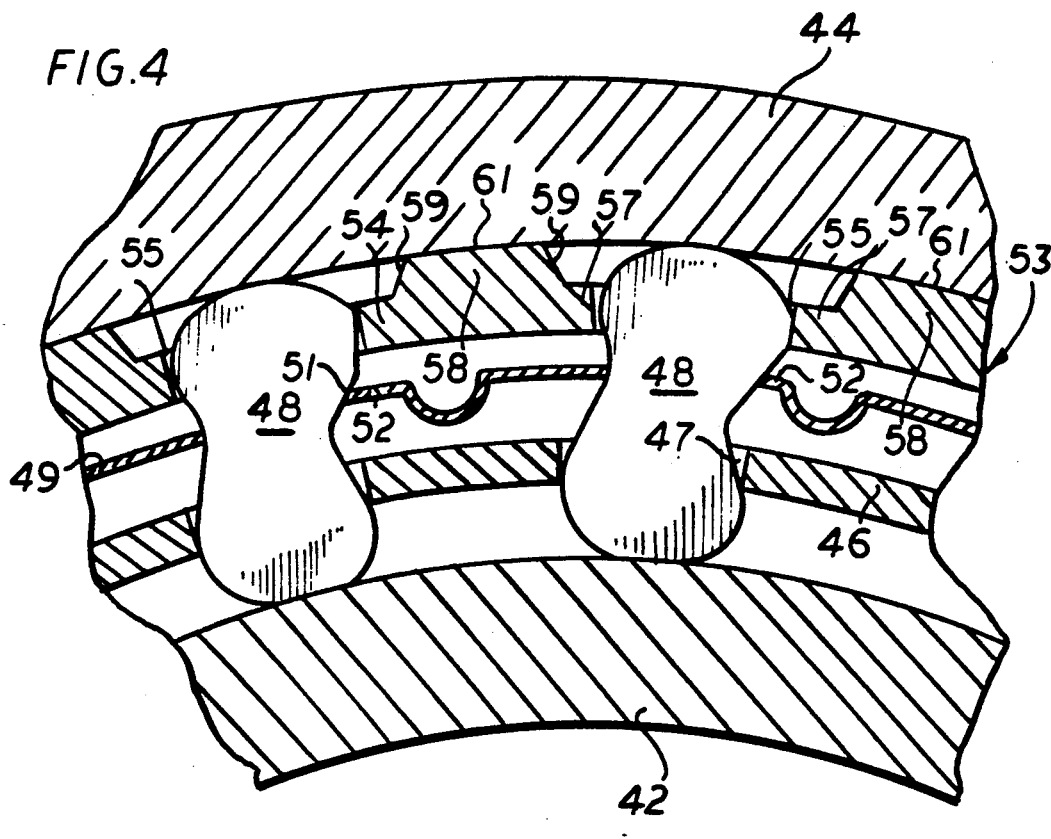
FIG. 4, is a vertical cross sectional view with the sprags shown in elevation taken on line 4—4 of FIG. 2.

FIGS. 2 and 3 disclose the improved one-way sprag clutch assembly 41 of the present invention which includes an inner race 42 having an exterior cylindrical surface 43, a concentric outer race 44 having an interior cylindrical surface 45, an annular inner cage member 46 having openings 47 to receive one end of a suitable sprag 48, an intermediate generally annular energizing spring 49 having openings 51 generally aligned with the openings 47 and provided with spring tabs 52 extending into each opening 51 to engage an indentation in the side of a sprag 48, and an outer annular cage member 53 which consolidates several functions that previously required additional structural elements to perform. This outer cage member comprises an annular generally cylindrical body 54 having openings 55 for the sprags, and an integral annular side wall or flange 56 acting as an end cap which is perpendicular to the cylindrical body 54. The openings 55 in the body are defined by a plurality of lateral crossbars 57, and formed on at least some of these crossbars are radially extending drag lands 58 which have tapered sides 59 terminating in a reduced width arcuate surface 61 contacting the interior surface 45 of the outer race 44 to provide inertia resistance for the clutch.

Extending radially outwardly from and in general alignment with the side wall 56 are a plurality of axial positioning protrusions which may be the teeth 62 shown in FIG. 3 or a continuous ridge which extends from the outer cage body 54 and side wall 56 to and extend into an annular groove 63 formed in the interior surface 45 of the outer race 44 to retain the cage members and clutch assembly from axial movement between the races. Opposite the side wall 56 is an end cap 64 having flanges 65 which fit over the adjacent edges of the inner and outer cage members; the outer cage member having a shoulder 66 formed on the end of the body to engage the end cap flange 65. A snap ring 67 is positioned within an annular groove 68 in the interior surface 45 of the outer race to prevent axial movement of the clutch in the opposite direction to movement of the clutch restrained by the teeth 62. A lubrication entry hole 69 is formed in the inner race 42, and the side wall 56 and end cap 64 provide lubrication escape barriers for lubricant that has entered the clutch assembly.

INDUSTRIAL APPLICABILITY

The invention described herein is readily applicable for use in automotive automatic transmissions, aircraft or any other place where one-way clutches are currently used.

I claim:

1. A one-way sprag clutch assembly (41) positioned between an inner race (42) and an outer race (44) comprising, in combination: an outer cage member (53) having an annular cage body (54) integrally formed with an annular side wall (56) extending perpendicular to said annular cage body (54) between such outer race (44) and such inner race (42), said outer cage member (53) further including a radially extended means (62) integrally formed therewith and generally aligned with said annular side wall (56) and received in an annular groove (63) formed in said outer race (53) to retain said clutch assembly (41) from axial movement relative to said races (42, 44) and a drag means (58) integrally formed therewith for engaging said outer race (44) to control vertical resistance; an inner cage member (46) spaced from said outer cage member (53) proximate said inner race (42); an annular energizing spring (49), positioned between said cage members (46, 53), having a plurality of generally radially aligned openings (47, 51, 55) adapted to receive a plurality of sprags therein; and an end cap (64) opposed to said integrally formed annular side wall (56) enclosing one end of said cages (46, 53) and spring (49).

2. A one-way sprag clutch assembly as set forth in claim 1, wherein said end cap (64) is retained from axial movement through a snap ring (67) received in an annular groove (68) formed in said outer race (44).

3. A one-way sprag clutch assembly as set forth in claim 1, in which said radial means comprises a plurality of radial protrusions (62) integrally formed as an extension of said side wall (56).

4. A one-way sprag clutch assembly as set forth in claim 1, in which said radial means comprises an annular ridge integrally formed as an extension of said side wall (56).

5. A one-way sprag clutch assembly as set forth in the claim 1, in which said end cap (64) and side wall (56) act as lubrication escape barriers for any lubricant present in the clutch assembly.

6. The one-way sprag clutch assembly of claim 1, wherein said annular cage body (54) includes a plurality of crossbars (57) defining said openings (55) for said sprags (48).

7. A one-way sprag clutch assembly as set forth in claim 6, in which said drag means comprises a plurality of circumferentially spaced tapered lands (58) integrally formed with and extending radially outwardly from said crossbars (57) to terminate in arcuate surfaces (61) engaging the interior surface (45) of said outer race (44).

8. A one-way sprag clutch assembly as set forth in claim 7, wherein said lands (58) are positioned on a plurality of said circumferentially spaced laterally extending crossbars (57), each having radially outwardly converging sides (59) terminating in said arcuate surface (61).

9. A one-way sprag clutch assembly as set forth in claim 7, wherein said lands (58) each have inclined end surfaces terminating in said arcuate surface (61).

* * * * *